United States Patent Office 3,225,691
Patented Dec. 28, 1965

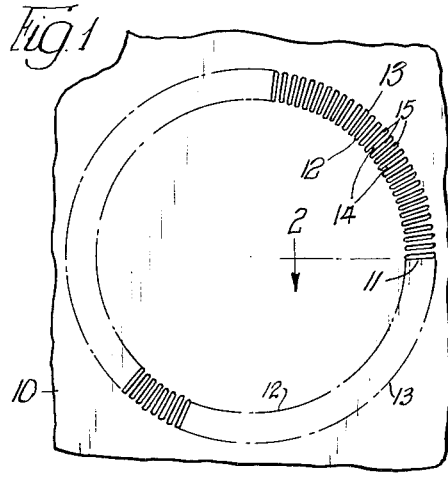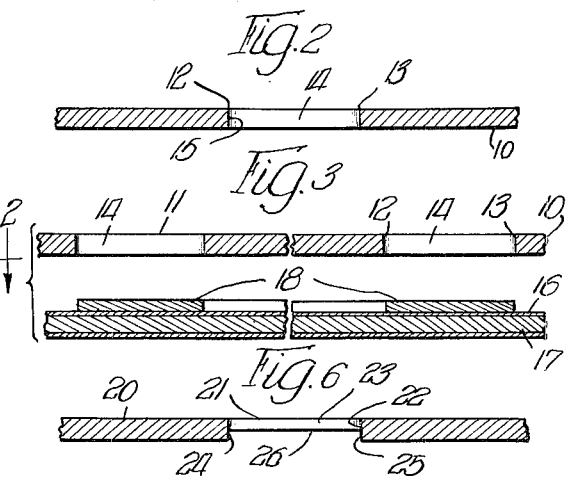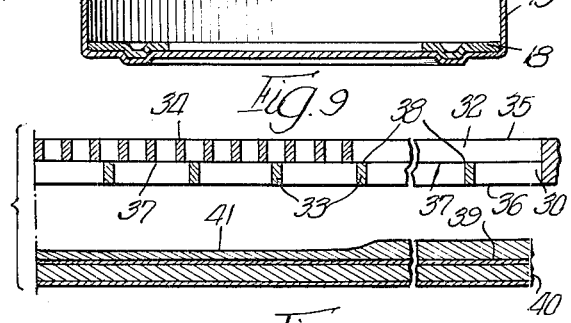

3,225,691
PRINTING PLATE FOR GASKET TYPE CLOSURES
Alfred W. Kehe, Berkeley, and Otto E. Heartstedt, Winnetka, Ill., assignors to Continental Can Company, Inc., New York, N.Y., a corporation of New York
Filed Mar. 10, 1961, Ser. No. 94,931
3 Claims. (Cl. 101—127)

This invention relates to the fabrication of closure members for hermetically sealing containers and is more particularly concerned with improvements in a method and apparatus for depositing a liner or gasket forming cushioning and sealing material on blank cap forming sheets preparatory to fabricating the caps.

Heretofore, two general methods of procedure have been employed in the manufacture of container closure elements of the type which are characterized by a top panel portion and a depending skirt, such as screw caps, lug caps, press-on caps and crown caps and which are customarily provided with a cushion liner or sealing gasket. In one method a plurality of cap shells or bodies have first been punched and formed from coated metal sheets and an elastic liner or gasket material has been applied to the individual cap bodies. Initially, the gasket material comprises a cork, natural rubber or composition material which was preformed and then inserted in the formed cap body. More recently, a gasket forming material has been employed which is a so-called "plastisol" type resin paste and which comprises a dispersion of finely powdered vinyl chloride homopolymer or copolymers of vinylidene chloride, vinyl acetate, or alkyl maleates in a plasticizer vehicle. Various stabilizers, pigments, fillers and adjunct materials have also been employed in these formulations. This type gasket material does not contain a volatile solvent and may be formulated with such viscosity that it may be squirted out of nozzles for deposit in the cap bodies. Such deposits will remain in position during the handling required in the manufacture of the caps and upon heating sufficiently the plasticizer diffuses throughout the resin particles so as to transform the plastisol from a pasty mixture to a permanent rubberlike gasket, the transformation being usually referred to as "fusion." A discussion of plastisol formulations of the type referred to is contained on pages 350 and 351 of the text, "The Chemistry of Commercial Plastics," by Wakeman, Reinhold Publishing Corporation, 1947. While substantial rates of production are achieved with the foregoing method, it is necessarily limited by the speed with which the individual cap bodies can be handled. Also, the nozzle method of depositing the plastisol is wasteful because the amount of the material deposited by the nozzles is not uniform and it has been found necessary to operate the nozzles so as to deposit a larger quantity of the plastisol than is required in order to obtain a satisfactory seal when the finished cap is forced down onto the top of a container such as a jar or glass and the rim or edge of the container presses into the gasket and forms a seal therewith.

Another method of fabricating the caps has been proposed which involves printing a coated metal sheet with discs or rings of the plastisol, fusing the latter and then punching and forming the shells with the gasket material already present on the blank. In practicing this method, it has been proposed that a silk screen process be employed for depositing the plastisol in gasket forming rings on the coated sheet metal blank. However, it has been found that this method is limited with respect to the plastisol formulations which can be employed. The formulation of plastisols for various purposes including flowed in gaskets has now become well developed and such materials are commercially available from several manufacturers or they may be formulated readily from commercially available ingredients. In using plastisols as a gasket material, it is desirable, in order to keep the cost to a minimum, that the gasket be made as thin as possible consistent with the normal variations and irregularities of the rims or lips of the containers to be sealed. The deposit cannot be too thin, however, since the thickness of the gasket material must be sufficient for the lowest points on the rims of the glass containers to engage and form a satisfactory seal with the gasket. Difficulty has been encountered in attempting to deposit the plastisol gasket material on the cap forming sheet material with ordinary silk screen printing materials when the plastisols are of relatively high viscosity. It has been found that either the silk screen will not hold up under the pressure necessary to force the plastisol through the openings or the deposit, when made, is uneven, showing to a large extent the pattern of the silk screen. Also, with the conventional silk screen it is not possible to deposit the gasket material with areas of different thickness or depth, as sometimes desired, in one application. To accomplish this result more than one screen pattern must be used and two or more deposits must be made.

It is a principal object of the present invention, therefore, to provide improved procedures and apparatus for depositing by a printing operation a liquid plastisol or similar gasket forming material on a coated metal blank preparatory to punching and forming closure caps from the printed blank with the gasket material properly located to form cushion seals when the caps are applied to the containers for which they are designed.

A further object of the invention is to provide a printing plate for use in depositing gasket forming materials of more than one thickness on closure cap forming blanks.

A still further object of the invention is to provide an improved printing plate for depositing gasket material and a method of forming the same which will permit satisfactory deposit of a plastisol or similar gasket material which is in a fluid state and which has a relatively high viscosity.

Another object of the invention is to provide a printing plate for use in depositing gasket forming plastisols on closure forming blanks which will permit a very thin deposit of the plastisol with a uniform thickness.

A more specific object of the invention is to provide a method of forming a printing plate for use in depositing a fluid material, such as a gasket forming plastisol, on the surface of a blank forming sheet which will permit the thickness of the deposit to be controlled with a high degree of accuracy whereby the plate may be formed so that in a single depositing operation with a single plate a deposit may be obtained with different thickness or depth of material in predetermined selected areas.

It is still another object of the invention to provide a printing plate for use in depositing gasket forming material on a closure cap forming blank which will permit the thickness of the deposit to be controlled so as to produce a gasket with a tapered or a so-called "feather edge."

These and other objects and advantages of the invention will be apparent from a consideration of the following detailed description thereof taken in connection with the accompanying drawings wherein:

FIGURE 1 is a plan view of a gasket printing plate prepared in accordance with the principles of the present invention;

FIGURE 2 is a fragmentary cross section taken on the line 2—2 of FIGURE 1, to a greatly enlarged scale;

FIGURE 3 is a fragmentary cross sectional view similar to FIGURE 2, illustrating the use of the plate of FIGURE 1 in printing or depositing a ring of gasket material on a coated sheet metal blank which is subsequently formed into a closure cap;

FIGURE 4 is a fragmentary plan view, on a reduced scale, of a cap forming sheet blank showing a plurality of rings of the gasket material printed thereon in proper spaced relation for forming a plurality of caps therefrom;

FIGURE 5 is a cross sectional view through a typical lug cap having a gasket formed in accordance with the present invention;

FIGURE 6 is a fragmentary cross section similar to FIGURE 2 but showing a modified form of the printing plate;

FIGURE 7 is a view of the bottom side of a gasket printing plate which is provided in accordance with the present invention for depositing gasket material so as to obtain variations in the thickness of the gasket across the width thereof;

FIGURE 8 is a view of the top side of the printing plate of FIGURE 7; and

FIGURE 9 is a fragmentary section taken on the line 9—9 of FIGURE 8, to a greatly enlarged scale, the view illustrating also the deposit of the gasket material on the cap forming blank.

Referring first to FIGURES 1 and 2 of the drawings, there is illustrated a portion of a multiple unit printing plate 10 which has been prepared in accordance with the principles of the present invention for use in printing or depositing a plurality of gasket configurations on a cap forming blank from a suitable gasket forming material. In the form illustrated, the printing plate 10 is prepared from an initially solid imperforate sheet of metal such as brass or any other metal which is capable of being etched by employing conventional etching procedures and appropriate etching materials. The plate portion shown has a single gasket configuration or printing area, indicated at 11, which is defined by inner and outer concentric circles 12 and 13 between which there extends a series of closely spaced, radial segments or rib sections 14. The rib sections 14 are separated by etched out areas or apertures 15 which, in the form shown, are of approximately the same shape and area as the rib sections 14. These etched out areas or apertures 15 form passageways for the gasket forming material in the use of the plate.

In using the plate 10 for printing or depositing the gasket material as illustrated in FIGURE 3, the body of the plate is, of course, imperforate while the gasket configuration 11 forms the perforated portion through which the gasketing material is forced during the printing or depositing operation. The printing plate 10 is clamped against the coated surface 16 of the cap blank 17 (FIGURE 3) and the plastisol is squeezed through the passageways or openings 15 in the printing area 11 of the plate to form the gasket deposit 18. The printing plate is removed while the plastisol is still fluid and the latter forms a solid band or ring between the lines 12 and 13 by the time it is "fluxed" or "fused." When the plate 10 comprises multiple printing areas or gasket configurations 11, the deposits 18 will appear on the cap blank as shown in FIGURE 4 in proper spaced relation for forming the caps. After the gasket deposits are "fluxed" the blank is punched to provide individual cap blanks and thereafter the individual caps are formed. A typical lug cap 19, which may be formed in this manner, is illustrated in FIGURE 5.

Printing plates embodying a gasket printing area 11 as shown in FIGURES 1 and 2 have been prepared according to the procedures set out in the following example:

A gasket design drawing was prepared with the gasket configuration having an outside diameter of 48 mm. and a width of 4 mm., the design incorporating approximately 100 radial lines 1.32 inch in width. A positive silk screen pattern was made with this drawing by a conventional photo emulsion process. The silk screen pattern was then used to deposit negative ink resist patterns in registered relation on both sides of a solid 6″ x 6″ sheet of brass plate having a thickness of .022″. The brass plate was then etched with the following solution: 15 cc. of saturated $FeCl_3$ solution (47% solids), 30 cc. of concentrates HCl and 200 cc. of $H_2O$. When the exposed portions of the metal design had been completely etched away and good definition obtained, the plate was removed from the etching bath and the resist ink was washed off with a solvent. After wiping and drying the etched plate was used to deposit a plastisol compound of relatively high viscosity on a cap blank. The high viscosity (100,000 cps.) plastisol was squeegeed through the etched portion of the plate onto a cap blank in the form of a prebaked organosol coated tin plate. The plate was removed and the plastisol deposit was cured or "fluxed" or "fused" for 3 to 5 minutes at 375° F. A well defined annular gasket was obtained having a thickness range of .015″ to .017″ and good adherence to the metal plate. The blank was then punched and formed into a closure cap.

Printing plates prepared in accordance with this procedure may be successfully employed for depositing gasket material, in proper patterns or configurations for forming a desired size and type of gasket, on uncoated or organic coated metal or non-metallic substrates, using as gasket material pastisols, organosols, synthetic latices etc. having a wide range of viscosity. Gasket configurations may be obtained which are very well defined because of good contact which can be obtained between the printing plate and and the blank, and the amount of the gasket material deposited can be controlled so that the thickness of the gasket is held within very close tolerances.

The etched printing plate can be prepared with a large number of gasket configurations 11 so that a plurality of deposits can be made in one operation on a cap forming blank of large dimensions, as indicated in FIGURE 4, and the printed blank may then be fed to a punching and forming machine which will simultaneously punch out and form the individual cap members with the gasket material already present in proper position on the blank for forming the gasket in the area of the top panel which adjoins the skirt or rim of each cap as indicated in FIGURE 5.

A modified form of printing plate which is especially adapted for depositing a gasket material having relatively high viscosity is illustrated in FIGURE 6. In this form, the plate 20 is provided with a gasket depositing pattern or printing area 21 which comprises radial apertures or slots 22 and separating segments or ribs 23 which are arranged between concentric circles in the same manner as illustrated in FIGURE 1. In this form, however, the gasket configuration or printing portion 21 of the plate which lies between the edge defining inner and outer concentric circles, indicated at 24 and 25 in FIGURE 6, is etched away in the preparation of the plate so that the ribs 23 are undercut, as indicated at 26, on the side of the plate which is clamped against the blank for the printing operation. The undercutting 26 extends between sharply defined edges which coincide with the circular lines 24 and 25 defining the inner and outer limits of the printing area 21. Printing plates embodying printing areas 21 have been prepared in accordance with the procedure in the following example:

A drawing was made of a circular gasket configuration with the gasket depositing area comprising approximately 100—1⁄32″ wide radial lines. A positive silk screen pattern was made of this drawing by conventional photo emulsion process. A second drawing was made with the gasket configuration having the same inner and outer diameters but being in the form of a solid ring. A positive silk screen pattern was made of this drawing in the same manner. The two silk screens were positioned on a brass plate having a thickness of .022″, one on each side thereof, in registered relation and negative resist patterns were formed on the two sides of the plate. The exposed portions of the metal were then etched away until the depths of the radial lines approximated .005″. After cleaning and drying the plate was used for depositing a high viscosity plastisol (500,000 c.p.s.) on a cap forming blank. The plate was placed with its underside, that is, the side which had the solid pattern of the printing area etched away, against the surface of the cap blank and the plastisol compound was squeegeed through the apertured pattern. The deposited plastisol was "fused" after the removal of the printing plate. The undercutting 26 of the radial rib formations 23 allowed the plastisol to form into a continuous circular deposit of uniform depth or thickness and also with well defined inner and outer edges providing a uniform width. The gasket formed was of a thickness ranging from .020" to .0215". This plate was found suitable for depositing plastisols with a viscosity of up to 500,000 c.p.s. without the screen pattern showing appreciably in the finished gasket.

The undercutting principle illustrated in FIGURE 6 may be employed to obtain variations in the thickness of the deposit. By varying the depth of the undercutting the thickness of the deposit can be changed or controlled. Also, this principle can be employed to obtain variations in thickness in predetermined selected areas of the final deposit with the use of a single plate and involving a single application or deposit of the material. For example, in FIGURE 6, if only a part of the bottom area covered by the pattern etched on the top surface of the plate is etched away or undercut on the bottom surface of the plate or if the pattern for etching the bottom is changed so that some areas are undercut while others are etched all the way through the plate, a greater amount or thickness of material will be deposited in the undercut areas than in the areas which are not undercut. By employing this principle, for example, a ring-like gasket deposit can be made in which there will be a greater depth or thickness in the outside marginal area of the gasket than in the remainder of the gasket. By extending the undercutting on the bottom surface of the plate beyond the margins of the pattern etched on the top surface a deposit may be obtained which has portions of different thickness and covers an area which is defined by the margins of the two etching patterns superimposed upon each other.

Referring to FIGURES 7 to 9 of the drawings, there is illustrated a printing plate 30 constituting a further modification of the invention which is adapted for depositing a gasket forming material in a pattern which will permit variations in the thickness of the gasket, for example, a gasket configuration possessing a feather-edge or in the form of an overall liner with the thickness decreasing from a maximum at the other edges of the top panel of the cap to a minimum in the inner non-sealing area of the panel. In the plate 30, which is designed for depositing gasket material to form an overall liner as well as a closure seal in the cap, the design of the gasket configuration for the printing area 31 comprises a combination of radial and circular rib formations 32 and 33 in the seal forming area with the radial ribs terminating at a perforated grid 34 in the center non-sealing area and the circular ribs extending beneath the grid 34. As shown in FIGURES 8 and 9, the top surfaces of the center grid 34 and the radial ribs or segments 32 are flush with the top face 35 of the plate 30 and are undercut by the etching process on the bottom face 36 of the plate as indicated at 37 in FIGURE 9. The circular ribs 33 have their bottom surfaces flush with the bottom face 36 of the plate 30 and are cut away on the top face 35 thereof as indicated at 38. The circular ribs 33 serve primarily as a support and reinforcement for the radial ribs 32 which separate the radial apertures 38 through which the plastisol is deposited. The areas of the apertures 38 defined by the radial and circumferential ribs 32 and 33 decrease in the direction inwardly of the outer periphery of the printing area 31 and the circular rib formations 33 hold the material in these areas against spreading in a radial direction during the depositing of the gasket material. The perforated grid formation 34 in the center area re-
sults in a deposit of the gasket material which is relatively thin and substantially uniform over the area.

The plate 30 may be prepared following the same procedures as described with respect to the plate shown in FIGURE 6. The drawings for the etching of the printing area 31 are prepared with one having concentric circles for positioning on the bottom face 36 of the plate and the other having the radial lines terminating at a center grid for positioning on the top face 35 of the plate. The two designs are positioned in register on opposite sides of the plate 30 during the application of the resist ink so that when the etching is completed the perforated pattern, as shown in FIGURES 7 and 8, is provided.

The plate 30 is employed in the depositing or printing of the gasket forming plastisol in the same manner as described with respect to the use of plates 10 and 20 and as indicated in FIGURE 9. The bottom face 36 of the plate as shown in FIGURE 7 is positioned against the coated face 39 of the cap blank 40 and the plastisol is squeegeed through the apertures in the printing area 31. When the plate 30 is removed from the surface of the blank the deposit 41 of the gasket forming material which remains on the plate 40 varies from very thin in the center or grid area 34 to substantially thicker adjacent the outer periphery of the printing area, the different areas of the deposit flowing or merging into each other to fill up the spaces occupied by the circular rib sections 33 during the squeegee operation.

While the foregoing description refers particularly to the use of the present invention in connection with the fabrication of closure caps for jars or like containers, it is not limited to such use since it is equally applicable to the preparation of lids for closing cans where the lid is provided with a sealing compound applied to the seam forming marginal portions thereof. The present invention permits the deposit of a film of uniform thickness where the configuration is rectangular or other than circular and where the deposit of the material by other methods results in undesirable thick and thin spots. It permits accurate control of the thickness of the deposit of the material so as to obtain thick or thin areas, only if desired, and in any selected portion of the deposit area with one plate and one application of the material. It is applicable for the deposit of any fluid material which can be squeegeed through the etched plate on any surface on which the material can be deposited where accurate control of the thickness of the deposit is desired.

The invention has been illustrated and described in accordance with the present practices. It will be understood that variations in procedure and equivalent materials may be resorted to within the scope of the invention as defined in the accompanying claims.

We claim:

1. A printing plate for depositing a flowable plastic gasket forming material on a sheet metal blank which is adapted to be formed into closure caps, said printing plate being formed from a thin sheet of solid metal and having an apertured circular printing area corresponding to the configuration of the gasket forming area and a center liner forming area within the gasket area, said printing area being etched so as to provide a series of radially extending apertures separated by radially extending ribs formations with the rib formations terminating at an apertured center grid formation, said rib formations and said center grid formation being etched away on the bottom forming side of the plate so that they are of lesser thickness than the body of the plate thereby to permit the deposit of the gasket material in a confined area corresponding to the gasket and liner forming areas when the plate is positioned with the bottom side on a cap forming blank and the gasket forming material is forced into the apertures and onto the blank.

2. A printing plate for depositing a flowable plastic gasket and liner forming material on a sheet metal blank which is adapted to be formed into caps, said printing plate being formed from a thin sheet of solid metal and having an apertured printing area corresponding to the pattern of the gasket and liner with the printing area being etched so as to provide about the periphery thereof a series of radially extending apertures separated by radially extending rib formations and at the center thereof a screen grid formation with the rib formations and the screen grid formation having portions etched away on the bottom forming side of the plate and a series of radially spaced concentric rib formations in the etched away areas on the bottom side of the plate connecting the rib formations and the screen grid and reinforcing the same whereby to permit the deposit of gasket material of relatively high viscosity in a confined area corresponding to the area of the gasket and liner when the plate is positioned with the bottom side on a cap forming blank and the gasket forming material is forced into the apertures and onto the blank with the deposit having uniform thickness in the gasket forming area and having reduced thickness in the liner forming area.

3. A method of preparing a plate for depositing on sheet metal blanks a material in a liquid state which method comprises preparing a drawing of the desired configuration for the deposit of the material with a series of circumferentially spaced, generally radial lines in an area which extends between spaced lines defining the inner and outer periphery of said area, preparing a second drawing of the deposit configuration with a solid area, preparing silk screen patterns of the drawings by conventional photo emulsion process, employing the silk screens thus formed to deposit negative ink resist patterns with the two areas in register on opposite sides of a relatively thin solid metal plate and subjecting the plate to a suitable etching solution so as to remove the exposed portions of the metal in the two deposit areas and provide in the plate printing areas comprising apertures and solid plate areas which are etched away at least in part on the bottom surface of the plate so as to deposit different thicknesses of the material in predetermined portions of the deposit areas.

References Cited by the Examiner

UNITED STATES PATENTS

| | | | |
|---|---|---|---|
| 1,658,765 | 2/1928 | Fordyce. | |
| 1,878,895 | 9/1932 | Schutte | 101—129 X |
| 2,254,033 | 8/1941 | Fitzgerald | 101—128.3 |
| 2,421,607 | 6/1947 | Fowler | 101—128.2 |
| 2,516,647 | 7/1950 | Rogers et al. | 113—8 |
| 2,569,752 | 10/1951 | Fowler | 101—128.3 |

FOREIGN PATENTS 1,028,326   2/1953   France.

OTHER REFERENCES

Swiggett, R. L.: Introduction to Printed Circuits, N.Y., John F. Rider Publisher, Inc. 1956, TK 7870, S85, only pp. 28 to 31, 34, 35, and 37 made of record.

DAVID KLEIN, *Primary Examiner.*

ROBERT A. LEIGHY, WILLIAM B. PENN, *Examiners.*